United States Patent
Hood, III et al.

(10) Patent No.: US 9,430,000 B2
(45) Date of Patent: Aug. 30, 2016

(54) INFORMATION HANDLING SYSTEM HOUSING LID WITH SYNCHRONIZED MOTION PROVIDED BY A FLEXIBLE COMPRESSIVE MEMBER

(71) Applicant: Dell Products L.P., Round Rock, TX (US)

(72) Inventors: Charles D. Hood, III, Cedar Park, TX (US); Chiu-Jung Tsen, Hsinchu (TW)

(73) Assignee: Dell Products L.P., Round Rock, TX (US)

( * ) Notice: Subject to any disclaimer, the term of this patent is extended or adjusted under 35 U.S.C. 154(b) by 412 days.

(21) Appl. No.: 13/941,247

(22) Filed: Jul. 12, 2013

(65) Prior Publication Data

US 2015/0016040 A1 Jan. 15, 2015

(51) Int. Cl.
*G06F 1/16* (2006.01)
*E05D 7/00* (2006.01)
*E05D 3/12* (2006.01)

(52) U.S. Cl.
CPC .............. *G06F 1/1681* (2013.01); *E05D 7/00* (2013.01); *E05D 3/12* (2013.01); *E05Y 2201/62* (2013.01); *E05Y 2900/606* (2013.01); *Y10T 16/53864* (2015.01); *Y10T 29/24* (2015.01)

(58) Field of Classification Search
CPC .... F16M 11/10; F16M 11/00; F16M 11/041; F16M 2200/02; E05D 3/12; E05D 7/00; E05Y 2201/62; E05Y 2900/606; G06F 1/1601; G06F 1/1632; G06F 1/1681; Y10T 16/53864; Y10T 29/24
USPC ............ 16/302; 248/371; 29/11; 361/679.01, 361/679.27

See application file for complete search history.

(56) References Cited

U.S. PATENT DOCUMENTS

| | | | |
|---|---|---|---|
| 5,325,984 A | 7/1994 | Ady et al. | |
| 5,987,704 A * | 11/1999 | Tang | G06F 1/1681 16/342 |
| 6,266,236 B1 | 7/2001 | Ku et al. | |
| 6,771,494 B2 | 8/2004 | Shimano | |
| 6,901,937 B2 | 6/2005 | Sebban | |
| 7,155,266 B2 | 12/2006 | Stefansen | |
| 7,730,587 B2 | 6/2010 | Chang et al. | |
| 7,738,930 B2 | 6/2010 | Petrella | |
| 2006/0236505 A1 * | 10/2006 | Maatta | G06F 1/1681 16/366 |
| 2008/0109995 A1 * | 5/2008 | Kuwajima | H04M 1/022 16/354 |
| 2008/0307608 A1 * | 12/2008 | Goto | G06F 1/1618 16/366 |
| 2009/0000062 A1 * | 1/2009 | Yamanami | G06F 1/1616 16/366 |
| 2011/0271486 A1 * | 11/2011 | Wang | G06F 1/1681 16/319 |
| 2011/0291536 A1 * | 12/2011 | Jauvtis | G06F 1/1683 312/319.2 |
| 2012/0096678 A1 * | 4/2012 | Zhang | G06F 1/1681 16/302 |

(Continued)

FOREIGN PATENT DOCUMENTS

WO    WO2005101963 A2    11/2005

*Primary Examiner* — Courtney Smith
*Assistant Examiner* — Michael Matey
(74) *Attorney, Agent, or Firm* — Terrile, Cannati, Chambers & Holland, LLP; Robert W. Holland

(57) ABSTRACT

An information handling system converts from a closed position to a tablet position by rotating a lid with a display 360 degrees about a hinge having synchronized and continuous motion. The hinge has first and second axles held in a spaced and substantially parallel orientation by a support. A flexible compressive member translates motion of each axle to the other to provide fluid movement of the lid relative to the housing. For instance, ball bearings disposed in guide formed in the support translate rotational motion between a first and second axles.

19 Claims, 4 Drawing Sheets

(56) References Cited

U.S. PATENT DOCUMENTS

| | | | | |
|---|---|---|---|---|
| 2012/0110784 A1* | 5/2012 | Hsu | .................. | G06F 1/1681 16/226 |
| 2012/0182677 A1* | 7/2012 | Seo | .................. | H04B 1/385 361/679.01 |
| 2013/0021735 A1* | 1/2013 | Pu | .................. | G06F 1/1618 361/679.17 |
| 2013/0111704 A1* | 5/2013 | Mitsui | .................. | H04M 1/022 16/250 |
| 2013/0139355 A1* | 6/2013 | Lee | .................. | H04M 1/022 16/354 |
| 2013/0194741 A1* | 8/2013 | Uchiyama | .................. | G60F 1/1681 361/679.26 |
| 2014/0223693 A1* | 8/2014 | Hsu | .................. | G06F 1/1681 16/282 |

\* cited by examiner

INFORMATION HANDLING SYSTEM HOUSING LID WITH SYNCHRONIZED MOTION PROVIDED BY A FLEXIBLE COMPRESSIVE MEMBER

BACKGROUND OF THE INVENTION

1. Field of the Invention

The present invention relates in general to the field of information handling system housings, and more particularly to an information handling system housing lid with synchronized motion provided by a flexible compressive member.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems are built in housings having a variety of configurations. A traditional clamshell configuration has a lid rotationally coupled to a main chassis portion so that the lid articulates between open and closed positions. In the open position, the lid rotates approximately 90 degrees to expose a display that presents visual information provided by processing components disposed in the main chassis portion. In the closed position, the lid rotates to bring the display against the main chassis portion to provide portability. Although conventional clamshell configurations provide ease of use and convenience, when the lid is free to rotate the display supported by the lid generally does not offer a firm enough platform for accepting touchscreen inputs. For this and other reasons, portable information handling systems that include a touchscreen display in an articulating lid generally provide rotation to a tablet-type of configuration in which the lid is supported to remain stationary during touch interfaces. For example, one option is to rotate the lid from the closed position for 360 degrees so that the display is exposed like a tablet and resting against the bottom surface of the main chassis portion.

One difficulty with rotation of an information handling system lid for 360 degrees relative to a housing is that the hinge used to perform the rotation has to allow the lid to rest flat relative to both the upper and lower surfaces of the housing. Although a relatively large hinge can include movement of the lid relative to the housing so that flat alignment to an upper and lower surface is provided, end user's generally prefer to have portable information handling systems with a small form factor. One alternative that provides full rotation is the use of a double hinge so that motion is provided at an axis proximate to the lid and an axis proximate the housing. The lid opens to expose the display by rotating about the axis proximate the lid and rotates to an opposite surface of the housing about the axis proximate the housing. In order to coordinate the movement of the lid relative to the housing, one or more cams engage as the lid rotates so that movement occurs about one axis or the other in an unsynchronized and discontinuous fashion, such as two 180 degree movements of the lid relative to the housing.

SUMMARY OF THE INVENTION

Therefore a need has arisen for a system and method which provides synchronized and continuous movement of a lid relative to a housing for conversion of a portable information handling system to and from a tablet configuration.

In accordance with the present invention, a system and method are provided which substantially reduce the disadvantages and problems associated with previous methods and systems for rotation an information handling system lid relative to a housing. Continuous motion of an information handling system housing and lid is provided by a hinge having first and second axles synchronized by translation of motion between the first and the second axles with compressive force transferred from a first axle through a flexible member to a second axle.

More specifically, an information handling system processes information with components disposed in a housing, such as a processor and memory, and presents the information as visual images at a display disposed in a lid. The lid rotates substantially 360 degrees relative to the housing between a closed position and a tablet position. A hinge couples the lid to the housing with a first axle coupled to the lid and a second axle coupled to the housing. A support holds the first and second axles in a spaced and substantially parallel relationship and integrates a flexible compressive member to translate rotational motion between the first and second axles. For instance, a guide formed in the support contains ball bearings that accept a rotational force from the first axle for communication through the guide to the second axle. In an alternative embodiment, a spring inserted in the guide transfers rotational force between the first and second axles.

The present invention provides a number of important technical advantages. One example of an important technical advantage is that synchronized and continuous movement is provided for a lid relative to a housing during conversion of a portable information handling system to and from a tablet configuration. End users are provided with an improved user experience with full movement of a lid relative to a display that is not broken up as different portions of a hinge provide movement. Motion about each axis of a double hinge is maintained fluidly relative to each other by a flexible compressive member that synchronizes motion of the axles as one axle moves relative to the other. Rotating axles fluidly coupled by a flexible compressive member provide improved reliability and improved manufacturability by allowing assembly of the flexible compressive member into the axle support before assembly of the axles into the hinge.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system rotates a lid relative to a housing with a continuous and synchronized motion of a two-axle hinge having rotational movement translated between the axles by a flexible compressive member. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
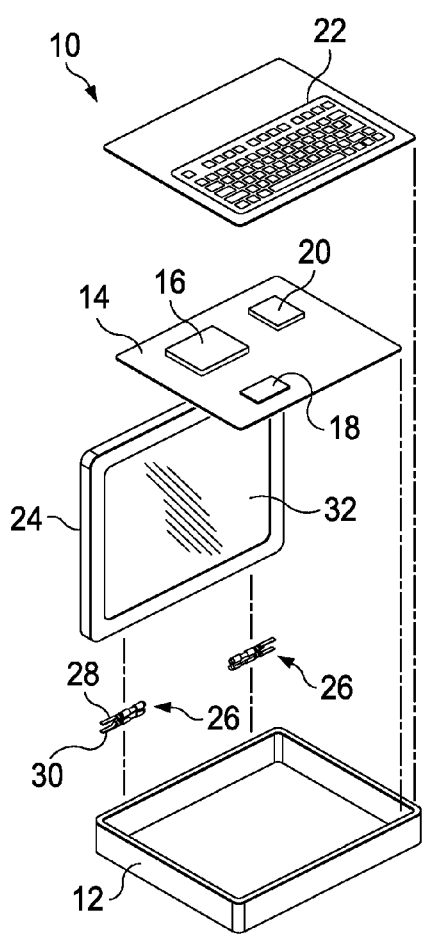
FIG. 1 depicts a blow-up view of a portable information handling system that processes information in a tablet configuration.

Referring now to FIG. 1, a blow-up view depicts a portable information handling system 10 that processes information in a tablet configuration. Portable information handling system 10 has a housing 12 that supports components to perform processing of information, such as a motherboard 14 that interfaces a CPU 16, RAM 18 and a chipset 20. Once motherboard 14 is assembled in housing 12, a keyboard 22 is placed over the components and interfaced with the chipset to accept end user inputs. A lid 24 rotationally couples with housing 12 by first and second hinges 26. Each hinge 26 includes a lid coupler 28 that couples hinge 26 to lid 24 and a housing coupler 30 that couples hinge 26 to housing 12. A display 32 disposed in lid 24 interfaces with components disposed in housing 12 to present information as visual images. Display 32 rotates with lid 24 and includes a touchscreen that accepts touch inputs so that an end user can change the position of display 32 as desired to view information and make touch inputs. In alternative embodiments, alternative types of configurations may be used for housing 12, lid 24 and hinges 26. For instance, instead of using two separate hinges 26, one continuous hinge may be used. Hinges 26 may be disposed in alternative locations as desired to rotate housing 12 and lid 24 relative to each other. The example information handling system configuration depicted by FIG. 1 is not meant to limit the synchronized and continuous motion of hinge 26 in alternative types of housings and devices, such as a device that includes a touch screen display in both the lid and housing portions.

Figure 2A:
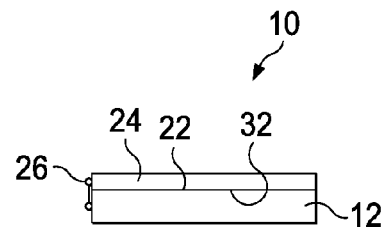
FIGS. 2A, 2B, 2C and 2D depict the portable information handling system in closed, clamshell, flat and tablet configurations respectively.
Figure 2B:
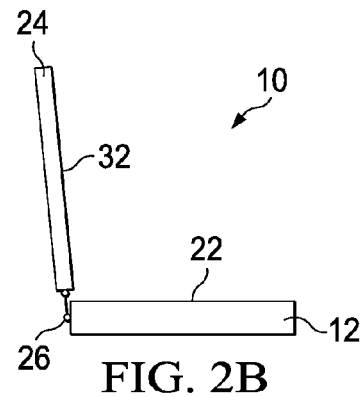
Figure 2C:
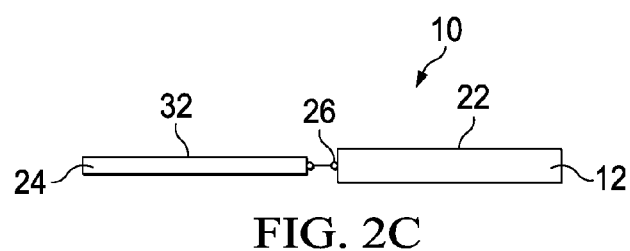
Figure 2D:
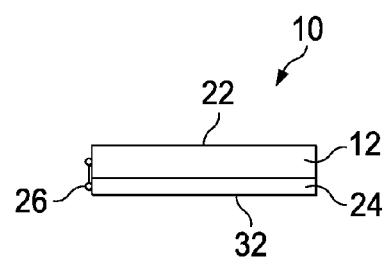

Referring now to FIGS. 2A, 2B, 2C and 2D, the portable information handling system 10 is depicted in closed, clamshell, flat and tablet configurations respectively. FIG. 2A depicts lid 24 rotated to a closed position so that display 32 is protected and resting against keyboard 22. FIG. 2B depicts lid 24 rotated substantially 90 degrees about hinge 26 relative to housing 12 to an open clamshell configuration having display 32 presented to an end user for viewing and keyboard 22 presented to an end user for accepting inputs. FIG. 2C depicts lid 24 rotated substantially 180 degrees about hinge 26 relative to housing 12 to a flat configuration. In a flat configuration, hinge 26 aligns lid 24 and housing 12 to have a level surface so that an embodiment having a display in lid 24 and housing 12 will appear as a flat unit. FIG. 2D depicts lid 24 rotated substantially 360 degrees about hinge 26 relative to housing 12 to a tablet configuration. In FIG. 2D, lid 24 rotates to a position underneath housing 12 to expose display 32 at the bottom of housing 12 and keyboard 22 at the top of housing 12. To use information handling system 10 as a tablet, the end user flips housing 12 to expose display 32 on top and makes inputs to the touchscreen.

Figure 3:
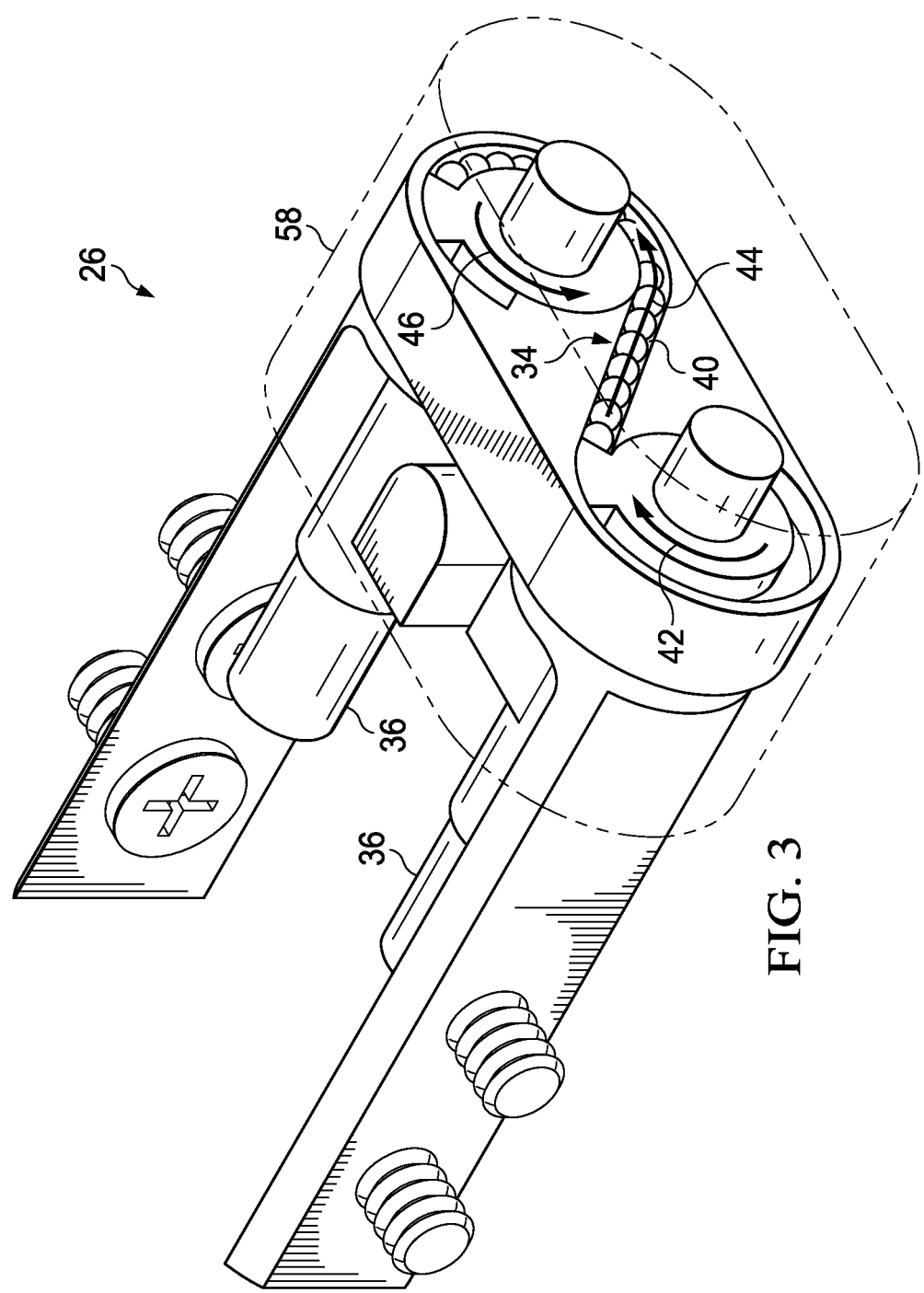
FIG. 3 depicts a side perspective cutaway view of a hinge for rotationally coupling the portable information handling system lid and housing that translates rotational motion with a flexible compressive member.

Referring now to FIG. 3, a side perspective cutaway view depicts a hinge 26 for rotationally coupling the portable information handling system 10 lid 24 and housing 12 that translates rotational motion with a flexible compressive member 34. Hinge 26 has first and second axles 36 held in a substantially parallel configuration by a support 38. A first of the axles 36 terminates at a lid coupler 28 that couples to a lid and a second of the axles 36 couples to a housing coupler 30 that couples to a housing. Axles 36 rotate within support 38 about spaced and substantially parallel axes relative to each other. Rotation of axles 36 is synchronized relative to each other by flexible compressive member 34. A compressive force placed against flexible compressive member 34 with the rotation of one axle 36 translates to the other axle 36 so that both axles rotate in a synchronized fashion.

In the example embodiment depicted by FIG. 3, flexible compressive member 34 is a set of plural ball bearings that are integrated in a guide 40 formed in support 38. In alternative embodiments, other types of flexible material may be used as a member to translate compressional force, such as a spring or a cable. As indicated by rotation arrow 42, rotation of a first axle 36 applies a compression force along translation arrow 44 to the second axle 36, which rotates in response in the direction indicated by rotation arrow 46. Guide 40 maintains the direction of the translational force as applied to a flexible material so that a flexible member will provide the translated rotational force in a desired manner. Rotation of either axle in either direction will result in translation of rotational force through guide 40 in an opposing direction. In alternative embodiments, guide 40 can direct the translated force to alternative points on the axle 36 to cause rotation in a common direction or along a different axis. In the example embodiment, ball bearings used to provide a flexible compressive member 34 do not compress and thus provide immediate translation of force between axes. In alternative embodiments, a spring, fluid or gas disposed in guide 40 may provide for some movement of one axle 36 independent of the other axle 36.

Figure 4:
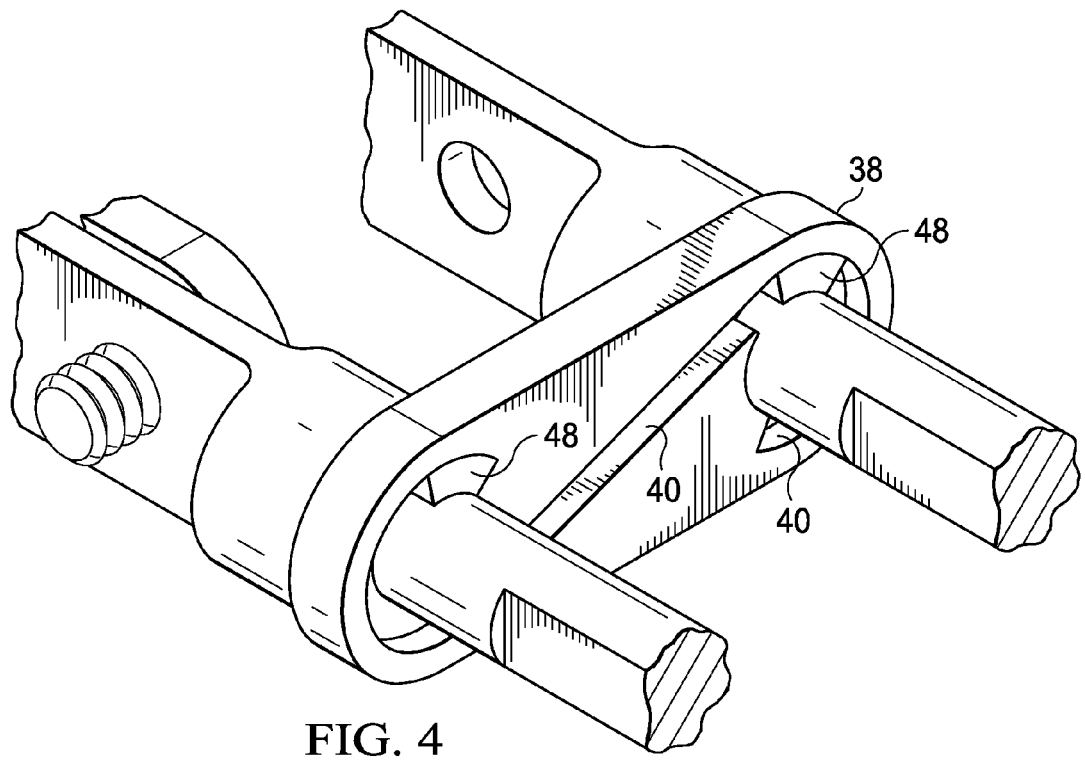
FIG. 4 depicts the hinge of FIG. 3 with the flexible compressive member removed.

Referring now to FIG. 4, the hinge of FIG. 3 is depicted with the flexible compressive member removed. Guide 40 formed in support 38 forms a partial figure eight between first and second axles 36 and terminates at an adapter 48 coupled to each axle 36. Adapter 48 extends into guide 40 to push a compressive force between a flexible member disposed in guide 40 and an axle 36 when an axle 36 rotates. In the depicted example embodiment, axle 36 has a circular portion exposed in guide 40 so that a flexible compressive member disposed in guide 40 is held proximate axles 36, thus providing a reduce size of support 38. For instance, ball bearings used as a flexible compressive member 34 roll along axle 36 during rotation of axle 36. In alternative embodiments, guide 40 may have alternative shapes that direct rotation of parallel axes in a common direction, etc.

Figure 5:
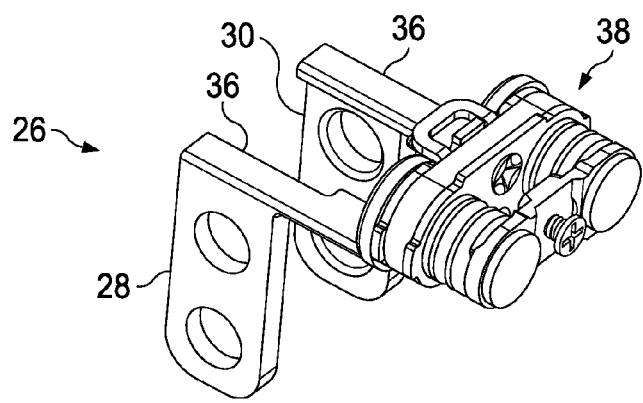
FIG. 5 depicts a side perspective view of an assembled hinge for rotationally coupling the portable information handling system lid and housing that translates rotational motion with a flexible compressive member.

Referring now to FIG. 5, a side perspective view depicts an assembled hinge 26 for rotationally coupling the portable information handling system lid and housing and that translates rotational motion with a flexible compressive member. The assembled hinge has a lid coupler 28 and housing coupler 30 for ready assembly to an information handling system. Lid coupler 28 and housing coupler 30 extend from axles 36, which interact through a flexible compressive member disposed in support 38. An assembled hinge 26 provides ease of manufacture for a convertible information handling system by reducing the need for assembly and calibration of hinge components during manufacture of the information handling system.

Figure 6:
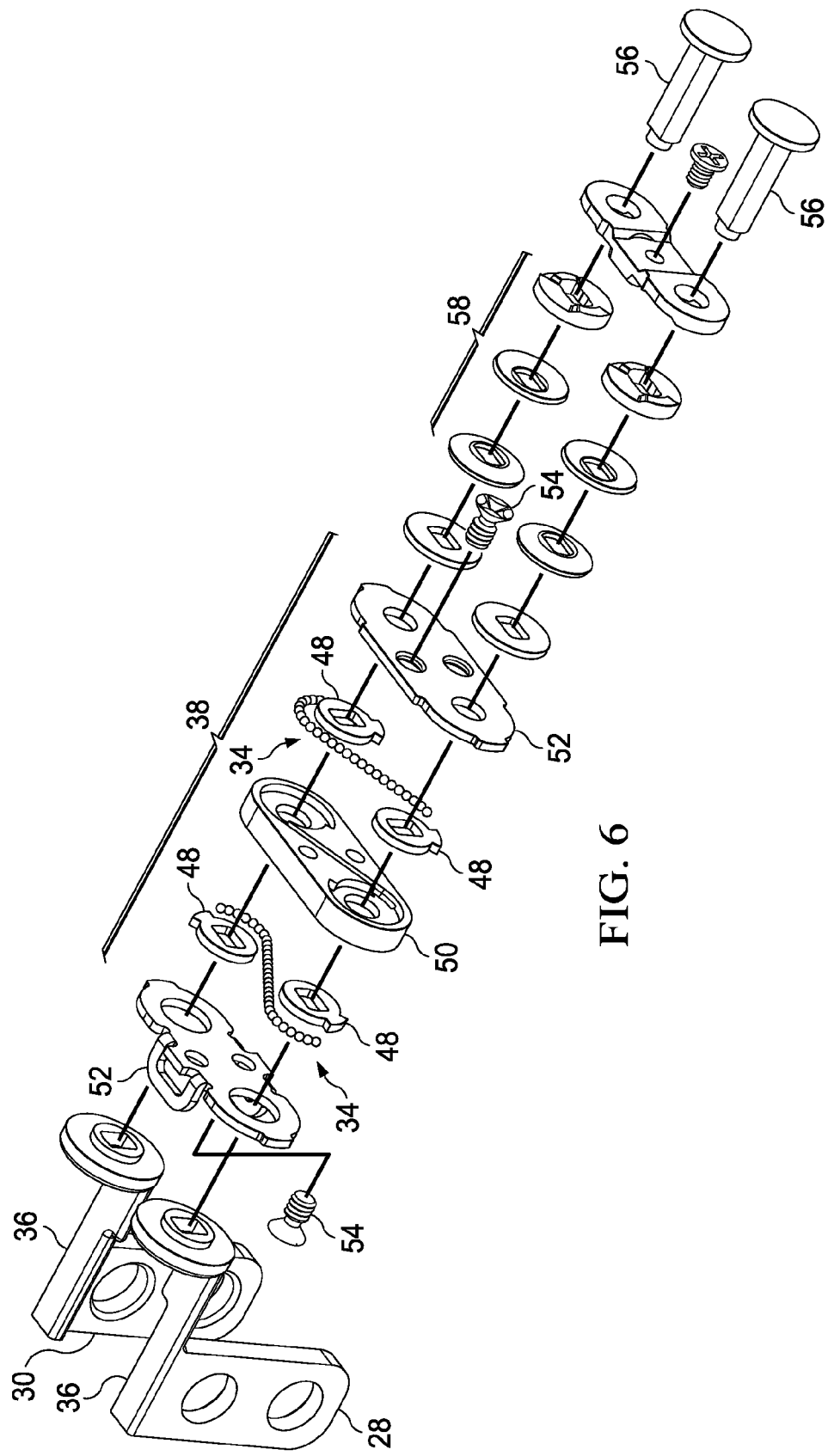
FIG. 6 depicts a blow-up view of the hinge of FIG. 5.

Referring now to FIG. 6, a blow-up view depicts the hinge of FIG. 5 before assembly into a contained hinge unit. Support 38 is built from a support body 50 having a support cover 52 coupled to each side to enclose adapters 48 and flexible compressive members 34. In the example embodiment, support body 50 includes a guide on each side so that first and second flexible compressive members 34 are enclosed on each side of support body 50 by each support cover 52. Having a flexible compressive member 34 on each side of support body 50 provides more smooth motion of axles 36 and improved reliability for hinge 26. Support covers 52 couple to support body 50 with screws 54 to contain ball bearings used as flexible compressive member 34 during assembly of hinge 26. First and second axles 36 insert into a guide opening formed at one support cover 52 and axle pins 56 insert into a guide opening formed on the opposing cover 52. Axle pins 56 insert through adapters 48 and into an opening formed in axles 36. An alignment edge formed in axle pins 56, adapter 48 and openings of axles 36 cooperate to align lid coupler 28 and housing coupler 30 into a desired position relative to each other during the assembly process. A friction assembly 58 provides resistance to rotational movement of axles 36 so that placement of the axles 36 in a position will be maintained unless a desired degree of force is applied to an axle 36, thus preventing too much freedom of motion of the axles 36. The amount of friction applied to each axle is adjusted by tension applied to bolts holding friction members of friction assembly 58 to support 38.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   components disposed in the housing to process information;
   a lid;
   a display disposed in the lid, the display interfaced with the components to present the information as visual images;
   a hinge rotationally coupling the housing and lid, the hinge having a first axle coupled at an end to the housing, a second axle coupled at an end to the lid, a support aligned perpendicular to the first and second axles and holding the first and second axles distal each other and first and second flexible compressive members translating rotation of the first axle to the second axle and the second axle to the first axle;
   wherein the support forms a first guide on a first side and a second guide on a second side, the first guide providing a path for translating force through the first flexible member in a first rotating direction, the second guide providing a path for translating force through the second flexible member in a second rotating direction, the first and second guides enclosed by first and second covers that contain the compressive members to direct compress force between the hinge axles.

2. The information handling system of claim 1 wherein the flexible compressive member comprises plural ball bearings disposed in the first and second guides communicating compressive force between the first and second axles.

3. The information handling system of claim 1 wherein the flexible compressive member comprises first and second springs disposed in the first and second guides communicating compressive force between the first and second axles.

4. The information handling system of claim 1 wherein the flexible compressive member comprises a fluid disposed in the first and second guides.

5. The information handling system of claim 1 wherein the flexible compressive member comprises a gas disposed in the first and second guides.

6. The information handling system of claim 1 further comprising plural hinges, each hinge rotationally coupling the housing and lid and having a first axle coupled at an end to the housing, a second axle coupled at an end to the lid, a support holding the first and second axles distal each other and a flexible compressive member translating rotation of the first axle to the second axle.

7. The information handling system of claim 1 further comprising one or more friction members in communication with at least one of the first and second axles to resist rotation of the first and second axles.

8. The information handling system of claim 1 wherein the hinge rotates the lid substantially 360 degrees relative to the housing.

9. A method for rotating an information handling system lid relative to a housing, the method comprising:
   coupling a first axle to the lid;
   coupling a second axle to the housing;
   coupling the first and second axles in a spaced, parallel relationship to a support;
   integrating a first flexible member at a first side of the support and a second flexible member at a second side of the support, the first flexible member translating force of rotation from the first axle to the second axle, the second flexible member translating force of rotation from the second axle to the first axle;
   enclosing the first and second flexible members in a guide, the guide directing compressive force displaced through the flexible members by pushing on the flexible members so that the compressive force translates between the first and second axles;

moving the lid to rotate the first axle; and transferring rotation of the first axle to the second axle with the first flexible member by pushing on the first flexible member with the first axle.

10. The method of claim 9 wherein the flexible member comprises plural ball bearings disposed in a first guide formed in the support first side and a plural ball bearings disposed in a second guide formed in the support second side.

11. The method of claim 9 wherein the flexible member comprises a first spring disposed in a first guide formed in the support first side and a second spring disposed in a second guide formed in the support second side.

12. The method of claim 9 further comprising transferring rotation of the second axle to the first axle with the flexible member by pushing on the flexible member with the second axle.

13. The method of claim 9 wherein moving the lid comprises rotating the lid from a closed position relative to the housing for substantially 360 degrees to a tablet position relative to the housing.

14. The method of claim 9 further comprising resisting rotation of at least one of the first and second axles with a friction member.

15. A hinge for rotating first and second parts relative to each other, the hinge comprising:

a first axle coupled to the first part;

a second axle couple to the second part;

a support disposed perpendicular to and between the first and second axles, the support and having a first guide formed on a first side and a second guide formed on a second side, the first guide enclosed by a first cover, the second guide enclosed by a second cover, the support holding the first and second axles in a spaced relationship; and first and second flexible members integrated in the support and in communication with the first and second axles, the flexible member operable to accept a compressive force generated by rotation of the first axle and to transfer the compressive force through the support guides to rotate the second axle, the compressive force translated through interaction of the compressive members and the enclosed guide.

16. The hinge of claim 15 wherein the flexible member comprises a fluid disposed in the first and second support guides.

17. The hinge of claim 15 wherein the flexible member comprises plural ball bearings disposed in the first and second support guides.

18. The hinge of claim 15 wherein the flexible member comprises a spring disposed in the first and second support guides.

19. The hinge of claim 15 wherein the flexible member comprises a gas disposed in the first and second support guides.

* * * * *